United States Patent

Croket

[19]

[11] Patent Number: 5,866,017

[45] Date of Patent: Feb. 2, 1999

[54] TRACKING ARRANGEMENT FOR A MOVING BELT

[75] Inventor: Frank M. Croket, Jefferson County, Ky.

[73] Assignee: Advanced Filtraion Concepts, Louisville, Ky.

[21] Appl. No.: 876,577

[22] Filed: Jun. 16, 1997

[51] Int. Cl.⁶ .................................................. B01D 33/056
[52] U.S. Cl. .......................... 210/783; 210/400; 210/401; 210/541; 210/DIG. 3
[58] Field of Search .................... 210/386, 400, 210/401, 541, DIG. 3, 783

[56] References Cited

U.S. PATENT DOCUMENTS

| | | | |
|---|---|---|---|
| 3,075,647 | 1/1963 | Davis | 210/401 |
| 3,113,926 | 12/1963 | Kroff | 210/401 |
| 3,116,244 | 12/1963 | Davis et al. | 210/401 |
| 3,144,409 | 8/1964 | Jauhola | 210/391 |
| 3,464,557 | 9/1969 | Fowler | 210/401 |
| 3,503,517 | 3/1970 | Barnebl et al. | 210/401 |
| 3,598,244 | 8/1971 | Babcock, Jr. | 210/401 |
| 3,615,023 | 10/1971 | Barnebl et al. | 210/401 |
| 3,642,142 | 2/1972 | Barnebl et al. | 210/401 |
| 3,807,569 | 4/1974 | Schaffer | 210/401 |
| 3,997,448 | 12/1976 | Woodland | 210/400 |
| 4,146,483 | 3/1979 | Lee | 210/400 |
| 4,191,653 | 3/1980 | Hampton | 210/400 |
| 4,684,011 | 8/1987 | Schneider | 198/779 |
| 4,885,088 | 12/1989 | Sbaschnigg | 210/400 |
| 4,911,841 | 3/1990 | Put | 210/400 |
| 4,963,259 | 10/1990 | Barcomb et al. | 210/386 |
| 5,238,501 | 8/1993 | Kappel et al. | 210/400 |

*Primary Examiner*—Christopher Upton
*Attorney, Agent, or Firm*—Polster, Lieder, Woodruff & Lucchesi

[57] ABSTRACT

A tracking system for a flexible moving belt wherein an adjustable protuberance arrangement on the belt support structure having a preselected removable and replaceable frictional surface which serves to engage against an adjacent face of the belt to align and center such flexible moving belt.

24 Claims, 3 Drawing Sheets

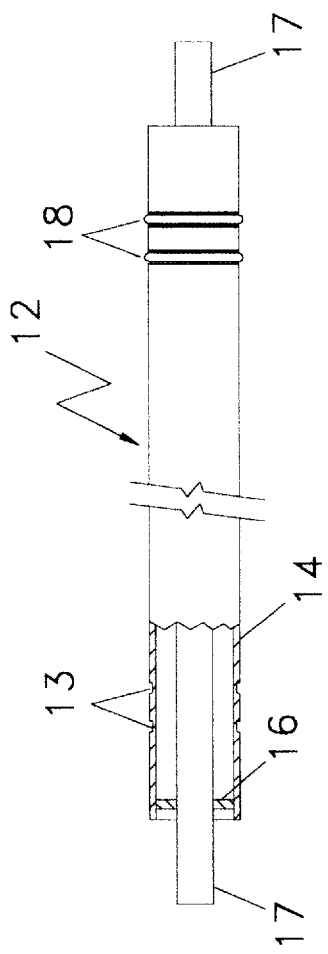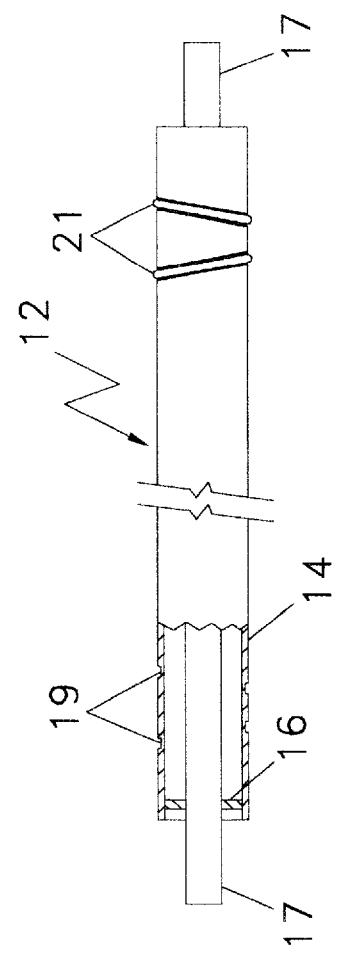

TRACKING ARRANGEMENT FOR A MOVING BELT

BACKGROUND OF THE INVENTION

The present invention relates to a tracking arrangement for a moving belt and more particularly to a tracking arrangement in the form of a centering and alignment structure for a supported moving flexible fibrous filter belt or web.

Moving filter belt arrangements, particularly those filter belts of porous fibrous material utilized with various types of pressure, vacuum and ambient filter structure for filtering particulate materials have employed a number of belt tracking or centering arrangements for the moving filter belts. These past tracking arrangements which have included crowned, rounded or tapered drive and/or driven rollers have not always proven to be effective with centering problems increasing with varying belt tensions and extended belt lengths and widths.

In prior U.S. patents, two types of structures generally have been utilized to track and centrally align moving belts—namely those which have utilized band members associated with belt support rollers and those which have utilized guide shoes associated with the side edges of moveable belts. In that group of patents utilizing roller associated band members, U.S. Pat. No., 3,116,244, issued to S. S. Davis et al on Dec. 31, 1963, teaches belt centering lands integral with moveable belt support rollers, the lands extending on the roller in a fixed, helically skewed direction to opposite roller extremities; U.S. Pat. No. , 3,144,409, issued to L. A. Jouhola on Aug. 11, 1964, also teaches similar lands or helical ridges formed on a discharge roller to extend to roller extremities with fluid pressure between spaced turns serving to transversely balloon a moveable support belt; U.S. Pat. No. 3,997,448, issued to E. Woodland on Dec. 14, 1976, teaches similar helices fixed to a support roller to impose a transverse bias on tension bands of a filter belt; and, finally U.S. Pat. No. 4,684,011, issued to T. C. Schneider on Aug. 4, 1987, teaches O-rings mounted on rollers with traction pressure shoes directly engaging such O-rings for effecting roller rotation. In effect, the band members of this group of aforementioned patents are functionally and structurally different from the novel and unique structural arrangement as set forth herein.

In that group of patents which utilize guide shoes, namely U.S. Pat. Nos. 3,503,517, issued to A. C. Barnebl on Mar. 30, 1970; No. 3,598,244, issued to R. E. Babcock, Jr. on Aug. 10, 1971; No. 3,615,023, issued to A. C. Barnebl on Oct. 26, 1971 and No. 3,642,142, issued to A. C. Barnebl et al on Feb. 15, 1972—each teaches belt edge gripping structure engaging along the side edges of a moveable belt to place a lateral tension thereon. This latter group of patents—like the aforediscussed band member patents are also functionally and structurally different from the novel inventive structural arrangement as set forth herein.

The present invention provides a new and novel tracking arrangement for a moving belt and particularly a flexible, woven fibrous and porous filter belt which is straightforward and economical in manufacture and assembly, eliminating or reducing many of the problems of past belt tracking arrangement, and, at the same time, requiring a minimum of parts and steps for effective operation. In addition, the present invention provides a structure and method which can be readily moved, adjusted and positioned for various types of belts, belt widths, belt fabrics and varying belt tensions, allowing for ready and easy adaptation and adjustment to various belt types, belt materials and belt sizing with ready and efficient removal and replacement of critical alignment parts as well as a proper balance of belt centering. At the same time, the novel and useful arrangement provides for straightforward and economical changing of tension in a moving belt both upon the central lineal axis of movement of a longitudinally extending belt and transverse such lineal axis of movement across the belt width.

Various other features of the present invention will become obvious to one skilled in the art upon reading the disclosure set forth herein.

BRIEF SUMMARY OF THE INVENTION

More particularly the present invention provides a tracking structure for maintaining a flexible moving belt in centered alignment on a belt support member comprising: a flexible belt of preselected width and with a longitudinally central lineal axis mounted on spaced belt support members for lineal movement of the belt along the support members, at least one of the support members including a substantially cylindrical roller having the longitudinal axis thereof extending transversely to the line of lineal movement of the flexible belt with the peripheral surface of the roller being adjacent the flexible belt; adjustable raised protruberance means extending at preselected raised locations from the peripheral surface at the roller to engage against an adjacent face of the adjacent flexible belt at preselected locations from the adjacent side edges of the belts to maintain the moving belt in continuos, centered alignment. Further, the present invention provides a novel method of tracking a wide, longitudinally extending, flexible moveable belt mounted on drive-driven support members for lineal movement of the belt along the longitudinally extending central axis thereof comprising: applying preselected tracking forces through the drive-driven support members at a preselected location away from opposite side edges and to at least one face of the belt when the belt is in lineal motion, the forces being substantially normal to the line of motion of the belt and at adjustable preselected locations to maintain the belt in centered position in its line of motion on the support member. Further, the present invention teaches a modified arrangement wherein forces applied to the belt are skewed to the line of belt motion.

It is to be understood that one or more changes can be made by one skilled in the art in one or more of the several parts of the inventive structure disclosed herein and in one or more of the several steps of the novel method disclosed herein without departing from the scope or spirit of the present invention.

BRIEF DESCRIPTION OF THE DRAWINGS

Referring to the drawings which disclose one advantageous embodiment of the present invention and a modification thereof:

FIG. 3 is an enlarged partially broken away support tensioned driven roller, such as that shown in the schematic cross-sectional view of FIG. 1, this driven roller also incorporating one advantageous embodiment of the novel tracking arrangement for a moving belt; and, FIG. 4 is an enlarged broken view of opposed ends of a roller like that of FIGS. 2 and 3 modified to show O-ring pairs skewed with respect to the longitudinal line of movement of the roller in accordance with another feature of the present invention.

DETAILED DESCRIPTION OF THE INVENTION

Figure 1:
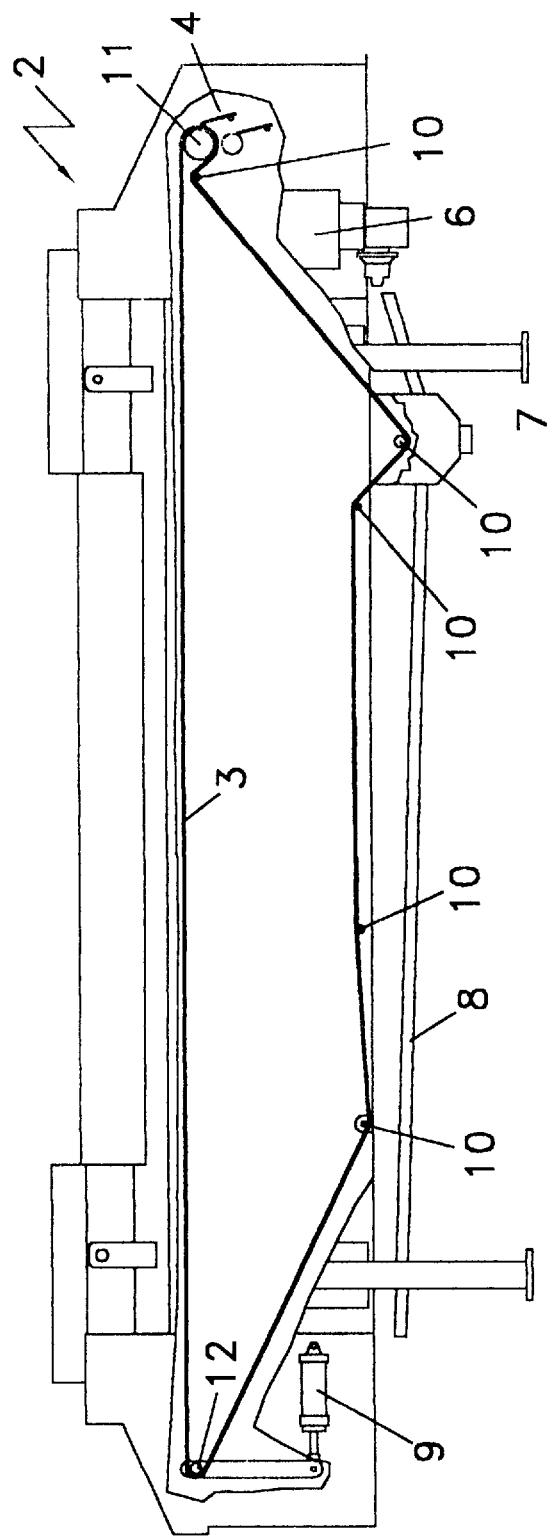
FIG. 1 is a schematic cross-sectional view of an endless filter belt support arrangement in a pressure filter tank which can incorporate the novel tracking arrangement for a moving belt in accordance with the present invention.

Referring to the schematic FIG. 1 of the drawings, longitudinally extending filtration tank 2 is disclosed incorporating therein the longitudinally extending movable endless filter belt 3. The arrangement as disclosed in FIG. 1 is particularly designed for pressure filtration; however, it is to be understood that the novel tracking arrangement of the present invention is not to be considered as limited to the arrangement disclosed but can be utilized for vacuum filtration as well and with any one of a number of moving belt structures which require belt tracking and centering alignment.

Cooperative with filtration tank 2 of FIG. 1 and adjacent the lower flight of endless moveable filter belt 3 is a belt scraper 4, a belt brush mechanism 6, a filter belt back wash mechanism 7, a drip pan 8 and a belt tensioning device 9. A suitable fluid inlet and fluid outlet (not shown) can be provided in filtration tank 2, advantageously along the top and side respectively of tank 2. Belt support drive roller 11(FIG. 2) is positioned adjacent to and beneath the upper flight of endless filter belt 3 at one end of tank 2 with idler or driven support roller 12 being positioned adjacent to and below the upper flight of endless belt 3 at the opposite end of filtration tank 2. Further, a number of spaced smaller idler rollers 10 can be provided to further guide endless filter belt 3 along its lineal, two flight path of movement.

Figure 2:
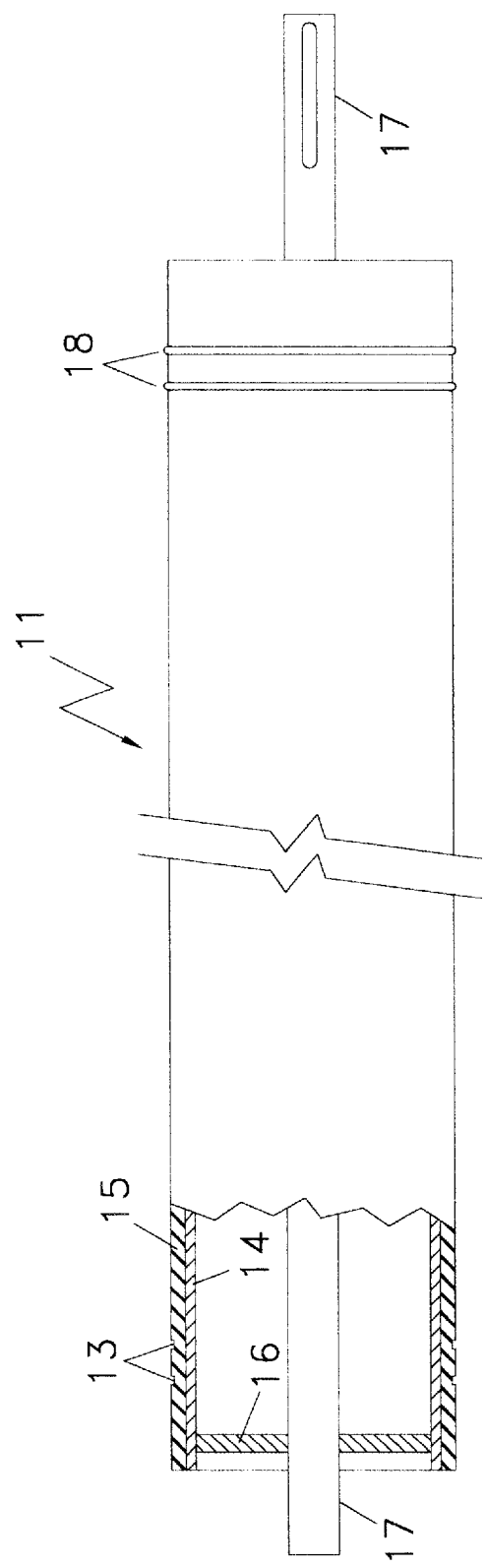
FIG. 2 is an enlarged partially broken away support drive roller, such as that shown in the schematic cross-sectional view of FIG. 1, this drive roller incorporating one advantageous embodiment of the novel tracking arrangement for a moving belt.

In accordance with the present invention and as can be seen more fully in the enlarged drawings of the drive and driven rollers of FIGS. 2 and 3 respectively, the inventive structure includes a flexible belt of preselected width and with a longitudinally central lineal axis the belt 3 being mounted on spaced belt support members for lineal movement of belt 3 along the support members. In the inventive embodiment disclosed, the support members as shown in FIG. 1 of the drawings would be the spaced cylindrical drive and driven rollers 11 and 12 respectively (FIGS. 2 and 3) and the spaced idler rollers 10 (FIGS. 1 and 3), each of the cylindrical rollers 11, 12 and 10 having its longitudinal axis extending transversely to the line of lineal movement of belt 3 with the peripheral surface of each roller being adjacent a face of the belt. Endless filter belt 3 in FIG. 1 of the application can be of a woven polyester material or can be of any other suitable filter material selected in accordance with the filtering conditions involved. Such belts generally are of a porous nature, capable of filtering particulate materials from a fluid stream in a size range of approximately thirty (30) to five hundred (500) microns and generally particulates of a size of approximately one hundred (100) microns are to be separated from a fluid stream. It is to be understood, however, that specially designed filter belts capable of filtering particulates outside the aforenoted size range can also be employed with the novel structure of the present invention as filtering conditions might dictate. Further, it is to be understood that the filter belt widths generally can vary in width in a range of thirty-eight (38) inches to ninety-four (94) inches and usually have stitched along opposed side edges thereof tightly woven side edge binders extending as much as two and one half inches from each edge thereof along opposed belt faces.

As aforedescribed, belt tensioning device 9 serves to regulate the lineal tension on belt 3 through the driven or idler roller 12 (FIG. 1).

In accordance with one feature of the present invention, at least one of the cylindrical drive and driven rollers 11 and 12 (FIGS. 2 and 3 respectively) can be provided with a set of spaced circumferential O-ring receiving grooves extending around the peripheral surface of the roller. In the embodiment disclosed in FIGS. 2 and 3, both drive roller 11 and driven or idler roller 12 are so provided with such groove sets, each set including pairs of spaced O-ring receiving grooves 13 positioned to be spaced from opposite ends of the roller. The grooves 13 which are formed in tube wrapper 15 snugly surrounding drive roller 11are of sufficient depth to accommodate approximately one third (⅓) the diameter of the O-rings to be inserted therein to minimize the possibility of O-ring displacement from each groove 13, advantageously with the outside groove 13 of a pair being positioned relative the roller 11 to allow engagement of an O-ring mounted in the groove with the adjacent face of filter belt 3 approximately along a line one (1) inch from the side edge of the belt 3. The inside groove of a pair of grooves advantageously is spaced approximately one (1) inch from the outside groove of a pair.

In FIG. 2, drive roller 11, which can be crowned is disclosed as comprised of a longitudinally extending cylindrical tube 14 made from a suitably selected strong material such as a metal alloy or plastic. Tube 14 has the aforementioned surrounding wrapper 15 of resilient material such as a suitable elastomer, like Buna™ or Viton™ in which grooves 13 are formed. Tube 15 also is provided at opposite ends fixed to the inner periphery thereof with closing plates 16 (only one of which is shown in FIG. 2). These plates 16 can also be of a similar material as tube 14. A drive shaft 17 extends through plates 16 to extend along the longitudinal central axis of tube 14. Shaft 17 is slotted at one end thereof to be keyed to a suitable drive motor (not shown).

A set of resilient O-rings 18 advantageously formed from a synthetic material of polymerized butadiene VitonTM are sized to be snugly and resiliently mounted in each of the O-ring groove pairs 13 with approximately one third of the diameter of each O-ring 18 snugly nesting in the groove to minimize possible displacement from engagement with the groove. The remaining portion of each O-ring serves as a protuberance to engage parallel to the line of belt motion against the adjacent face of filter belt 3 approximately one (1) inch and two (2) inches from each of the opposed side edges of endless filter belt 3, thus maintaining filter belt 3 in central alignment.

It is to be understood that the present invention is not to be considered as limited to the particular O-ring 18 and groove 13 arrangement as above described. For example the spacing, number, types of grooves and O-rings can vary without departing from the scope or spirit of the invention. For example and as disclosed in FIG. 4 of the drawings, the grooves can be so formed that the O-rings mounted thereon are advantageously skewed with respect to the line of belt motion and to the roller axis on which the grooves are formed. In the embodiment of FIG. 4, each groove 19 of a pair of grooves of a set is so formed that the O-rings 21 mounted therein can be positioned to be so skewed toward each other and to the line of belt motion as to actually grip the adjacent face of a filter belt 3 therebetween.

Advantageously, the skewing can be at a an angle to the otherwise normal O-ring, parallel to the line of motion position so as to be at an angle to the line of belt motion in an approximate range of one (1) to ten (10) degrees—the amount and direction of skew depending upon such parameters as the nature of material of the filter belt, location of filter belt engagement and the engaging frictional faces of the O-rings and filter belt. Also, the number of grooves and O-rings and their direction of skewing can be varied depending upon the lateral centering tension desired for belt 3.

The invention claimed is:

1. Tracking structure for maintaining a flexible moving belt in centered alignment on a support roller comprising:
    a flexible belt of preselected width and with a longitudinally central lineal axis mounted on spaced belt support members for lineal movement of said flexible belt along said support members;
    belt support members, at least one of said support members including a substantially cylindrical roller having the longitudinal axis thereof extending transversely to the line of lineal movement of said flexible belt with the peripheral surface of said roller being adjacent said flexible belt, and,
    adjustable and removably replaceable raised protuberance means extending at a preselected edge-spaced location proximate to an edge of said roller from the peripheral surface of said roller in snug engagement with preselected and formed positioning means on said roller to abut against the adjacent edge-spaced face of said adjacent flexible belt in preselected position to the line of lineal movement of said flexible moving belt to maintain said flexible moving belt in centered alignment.

2. The tracking structure of claim 1, said protuberance means abutting said belt face parallel to the line of lineal movement thereof.

3. The tracking structure of claim 1, said protuberance means abutting said belt face at a skewed position to the line of lineal movement thereof.

4. The tracking structure of claim 1, said protuberance means abutting said belt face at preselected distances from the said edges of said belt face.

5. The tracking structure of claim 1, said protuberance means abutting said belt face approximately one inch to two inches from opposed side edges of said belt.

6. The tracking structure of claim 1, said raised protuberance means comprising at least one removable resilient O-ring member with the inner surface thereof surrounding and snugly in engagement with said preselected and formed positioning means on the peripheral surface of said roller and the outer surface thereof abutting against the adjacent face of said adjacent flexible belt.

7. The tracking structure of claim 6, said resilient O-Ring being a synthetic rubber of polymerized butadiene.

8. The tracking structure of claim 6, said preselected and formed positioning means on said roller including a circumferential groove extending around the peripheral surface of said roller with a portion of the cross-section of said O-ring engaging in said groove and the remaining portion of the cross-section of said O-ring serving as a raised protuberance.

9. The tracking structure of claim 6, said preselected and formed positioning means on said roller including a circumferential groove extending around the peripheral surface of said roller with a depth sufficient to accommodate approximately one third the diameter of said O-ring with the remaining portion serving as a raised protuberance.

10. The tracking structure of claim 6, said raised protuberance means comprising a set of at least two spaced opposed O-rings members with members of the set snugly in engagement with said preselected and formed positioning means located spacedly adjacent opposite extremities of said roller with said O-ring members abutting against the adjacent face of said adjacent flexible belt width in preselected spaced relation from the opposed side edges of said flexible belt width.

11. The tracking structure of claim 10, said opposed O-ring members of said set being directionally skewed with respect to each other to slant outwardly away from each other and away from the line of movement of said central lineal axis of said flexible belt and toward the opposed side edges of said belt width to provide a tensional force laterally along said flexible belt width.

12. The tracking structure of claim 10, said set of spaced opposed O-rings including spaced pairs of O-rings members with each pair of O-rings of the set being positioned spacedly adjacent opposite extremities of said roller to abut as spaced pairs against the adjacent face of said flexible belt width in preselected spaced relation from the opposed side edges of said flexible belt width.

13. The tracking structure of claim 12, said O-ring pair of the set each having that O-ring of the pair closest to said central axis directionally skewed with respect to the other to slant outwardly away from the mirror image O-ring of the opposite pair and away from the line of movement of said central linear axis of said flexible belt so that said O-ring pairs pinchingly abut as spaced pairs against the adjacent face of said flexible belt width in preselected relation from the opposed side edges of said flexible belt width placing tension on said flexible belt along said central lineal axis and laterally transverse thereto.

14. The tracking structure of claim 1, said flexible belt being of a lightly woven webbing of filtering material.

15. The tracking structure of claim 1, said flexible belt being an endless belt and said support members including substantially cylindrical drive and idle rollers.

16. The tracking structure of claim 1 and means cooperative with said belt support members to regulate belt tension through said support members.

17. The tracking structure of claim 1, said adjustable raised protuberance having a frictionally treated surface to engage against said adjacent face of said flexible belt.

18. An improved tracking structure for endless filter belt arrangements comprising:
    an endless flexible filter belt of preselected length, width and porous filtering material, said belt having opposed side edge binders extending approximately two and one half inches along opposite faces of said belt adjacent opposed side edges thereof;
    a support structure for said endless filter belt including spaced drive and driven cylindrical rollers about which said endless filter belt is mounted for lineal movement, said cylindrical rollers each having the longitudinal axis thereof extending transversely to the line of lineal movement of said endless flexible filter belt mounted thereabout with the peripheral surfaces of said rollers being adjacent said binders extending along the side edges of a face of said endless flexible filter belt, said support structure including means to regulate the lineal tension on said endless filter belt;
    at least one of said cylindrical rollers including a set of spaced circumferential O-ring receiving grooves extending around the peripheral surface of the roller, said set of O-ring receiving grooves including pairs of spaced O-ring receiving grooves at edge-spaced opposite ends of said roller with each grooves of a pair being of sufficient depth to receive approximately one third the diameter of O-ring material to be inserted therein to minimize the possibility of O-ring displacement;

a set of removably and replaceable resilient O-rings of a synthetic material of polymerized butadiene sized to be snugly and removably mounted in said set of grooves with a portion of approximately one third the cross-sectional diameter of the material of each O-ring engaging in the groove in which it is snugly mounted and the remaining frictionally treated portion of the cross-section of each O-ring serving as a protuberance to engage against the side edge binders of an adjacent face of said endless flexible filter belt width so as to be in preselected relation from the opposed side edges of said endless flexible filter belt to maintain said flexible filter belt in centered alignment.

19. A method of tracking a wide longitudinally extending flexible moveable belt mounted on a drive-driven support member for lineal movement of said belt along the longitudinal central axis thereof comprising:

applying preselected spaced removable and replaceable tracking forces through the drive-driven support member at preselected edge-spaced locations proximate to an edge of said support member to at least one face of said belt when said belt is in lineal motion, said removable forces being preselectively positioned with respect to the line of motion, said belt being maintained in centered position in its line of motion.

20. The method of tracking a flexible moveable belt of claim 19 said removable and replaceable tracking forces including forces being applied spacedly adjacent to and along opposite width edge of said belt.

21. The method of tracking a flexible moveable belt of claim 19 said removable and replaceable tracking forces including forces being applied along opposite width edges of said belt and parallel to the line of lineal motion of said belt.

22. The method of tracking a flexible moveable belt of claim 19, said removable and replaceable tracking forces being applied along opposite width edges with said forces being preselectively skewed from belt lineal movement forward along opposite width edges of said belt.

23. The method of tracking a flexible moveable belt of claim 19, said removable and replaceable tracking forces being applied along opposite width edges in pairs along each edge of said belt.

24. The method of tracking a flexible moveable belt of claim 23, said removable and replaceable tracking force pairs being applied at a bias toward each other to inch feed said belt.

* * * * *